(12) United States Patent
Wu et al.

(10) Patent No.: US 8,806,981 B2
(45) Date of Patent: Aug. 19, 2014

(54) HANDLEBAR ASSEMBLY

(71) Applicant: Giant Manufacturing Co., Ltd., Taichung Hsien (TW)

(72) Inventors: Chi-Ming Wu, Changhua County (TW); Che-Wei Hsu, New Taipei (TW)

(73) Assignee: Giant Manufacturing Co., Ltd., Taichung (TW)

( * ) Notice: Subject to any disclaimer, the term of this patent is extended or adjusted under 35 U.S.C. 154(b) by 0 days.

(21) Appl. No.: 13/726,645

(22) Filed: Dec. 26, 2012

(65) Prior Publication Data

US 2014/0069226 A1 Mar. 13, 2014

(30) Foreign Application Priority Data

Sep. 12, 2012 (TW) .............................. 101133363 A (51) Int. Cl.
*B62K 21/12* (2006.01)
(52) U.S. Cl.
CPC ...................................... *B62K 21/12* (2013.01)
USPC ......................................................... 74/551.1
(58) Field of Classification Search
USPC ................. 74/551.1–551.6; 403/374.3, 374.4; 280/279
See application file for complete search history.

(56) References Cited

U.S. PATENT DOCUMENTS

| 718,641 | A | * | 1/1903 | Leavitt | 74/551.6 |
| 781,128 | A | * | 1/1905 | Calkins | 74/551.4 |
| 1,932,251 | A | * | 10/1933 | Nauts | 280/270 |
| 3,333,862 | A | * | 8/1967 | Rockwell | 280/87.021 |
| 4,171,824 | A | * | 10/1979 | Foster | 280/294 |
| 4,354,399 | A | * | 10/1982 | Katayama | 74/551.1 |

FOREIGN PATENT DOCUMENTS

EP            2308749           4/2011

* cited by examiner

*Primary Examiner* — Vicky Johnson
(74) *Attorney, Agent, or Firm* — Jianq Chyun IP Office (57) ABSTRACT

A handlebar assembly suitable to be installed on a steerer tube of a bicycle is provided. The handlebar assembly includes a stem, a handlebar, and a fastener. The stem has a first end and a second end opposite to the first end, wherein the stem has a first fastening surface positioned at the first end, and wherein the second end is suitable to be assembled to the steerer tube. The handlebar includes a middle portion and two handle portions, wherein the handle portions are positioned on two opposite sides of the middle portion respectively, and wherein the middle portion has a second fastening surface to be infixed to the first fastening surface. The fastener crosses the first fastening surface and the second fastening surface infixed to each other to fasten the stem and the handlebar and is positioned within the stem and the middle portion.

7 Claims, 10 Drawing Sheets

HANDLEBAR ASSEMBLY

CROSS-REFERENCE TO RELATED APPLICATION

This application claims the priority benefit of Taiwan application serial no. 101133363, filed on Sep. 12, 2012. The entirety of the above-mentioned patent application is hereby incorporated by reference herein and made a part of this specification.

BACKGROUND OF THE INVENTION

1. Field of the Invention

The present invention generally relates to a handlebar assembly, in particular, to a handlebar assembly of a bicycle.

2. Description of Related Art

In recent years, with the prosperity of the bicycle market, no matter high-end racing bicycles or general recreational bicycles, they all gain popularity among consumers. Moreover, the directions of the designs such as lightweight and high strength get more and more attentions so that bicycles adapted to different biking environments and usage needs have been developed or are being improved. Since the consumers are more and more pursuing speed, the importance of a handlebar assembly with low wind resistance has been raised.

In terms of a handlebar of a bicycle, it normally connects to a steerer tube of the bicycle via a stem for controlling the traveling direction of the bicycle. Therefore, the consumers may select a handlebar based on their individual requirement and process the installation.

In general, both ends of the stem include a steerer clamp and a handlebar clamp respectively. The stem is fixed on the steerer tube by the steerer clamp positioned at the tail end of the stem. The steerer clamp clamps the steerer tube from both left and right hand sides thereof. Therefore, the steerer clamp may be manufactured in a single unitary piece on the tail end of the stem and telescoped in the steerer tube via the top thereof and fixed on the steerer tube by screws.

On the other hand, the handlebar is fixed on the stem by the handlebar clamp positioned at the front end of the stem. The handlebar clamp clamps the handlebar from the middle portion thereof. Therefore, the handlebar clamp is normally arranged additionally on a clip at the front end of the stem, wherein the chip is fixed on the stem by screws for fixing the handlebar to the front end of the stem. Thus, the screws positioned on the handlebar clamp are then exposed on the appearance surface of the bicycle and get rusted easily and further affect the adaptability. Moreover, the larger the clamp is, the larger the wind resistance becomes.

SUMMARY OF THE INVENTION

Accordingly, the present invention is directed to a handlebar assembly including fewer components and possessing a low wind resistance and a high strength features. Based on requirements, the suitable sizes of the components of the handlebar assembly may be selected to be assembled and installed on a bicycle.

The present invention is directed to a handlebar assembly suitable to be installed on a steerer tube of a bicycle. The handlebar assembly includes a stem, a handlebar, and a fastener. The stem has a first end and a second end opposite to the first end, wherein the stem has a first fastening surface positioned at the first end, and wherein the second end is suitable to be assembled to the steerer tube. The handlebar includes a middle portion and two handle portions, wherein the handle portions are positioned on two opposite sides of the middle portion respectively, and wherein the middle portion has a second fastening surface to be infixed to the first fastening surface. The fastener crosses the first fastening surface and the second fastening surface infixed to each other to fasten the stem and the handlebar and is positioned within the stem and the middle portion.

According to an embodiment of the present invention, the stem has a through hole positioned on the first fastening surface, and the middle portion has a fastener hole positioned on the second fastening surface. The fastener crosses into the stem via the second end thereof and passes through the through hole to be fastened to the fastener hole.

According to an embodiment of the present invention, the stem has a convex fastening portion positioned on the first fastening surface and the middle portion has a concave fastening portion positioned on the second fastening surface, wherein the convex fastening portion is infixed to the concave fastening portion.

According to an embodiment of the present invention, a periphery of the convex fastening portion is a convex ramp surface and a periphery of the concave fastening portion is a concave ramp surface, wherein the convex ramp surface leans against the concave ramp surface.

According to an embodiment of the present invention, the convex fastening portion and the concave fastening portion are in a crisscross shape.

According to an embodiment of the present invention, the number of the fastener is two, wherein the fasteners are fastened on two opposite sides of the convex fastening portion and the concave fastening portion.

According to an embodiment of the present invention, the first fastening surface is a first sand-blasting surface and the second fastening surface is a second sand-blasting surface, wherein the first sand-blasting surface is infixed to the second sand-blasting surface.

According to an embodiment of the present invention, the fastener is arranged symmetrically with respect to the center of the first fastening surface.

Based on the above, the present invention provides a handlebar assembly, wherein a stem of the handlebar assembly includes a first fastening surface, and wherein a middle portion of the handlebar includes a second fastening surface, and wherein the second fastening surface is infixed to the first fastening surface. A fastener crosses the first fastening surface and the second fastening surface infixed to each other to fasten the stem and the handlebar and is positioned within the stem and the middle portion. Therefore, the user may select the handlebar and the stem with suitable sizes and fasten the stem and the handlebar by the fastener. Accordingly, the handlebar assembly includes fewer components and possesses a low wind resistance and a high strength features. Based on requirements, the suitable sizes of the components of the handlebar assembly may be selected to be assembled and installed on the bicycle and thus make the handlebar assembly be more convenient and practical.

In order to make the aforementioned and other objects, features and advantages of this invention comprehensible, a preferred embodiment accompanied with figures is described in detail below.

DESCRIPTION OF THE EMBODIMENTS

Figure 1:
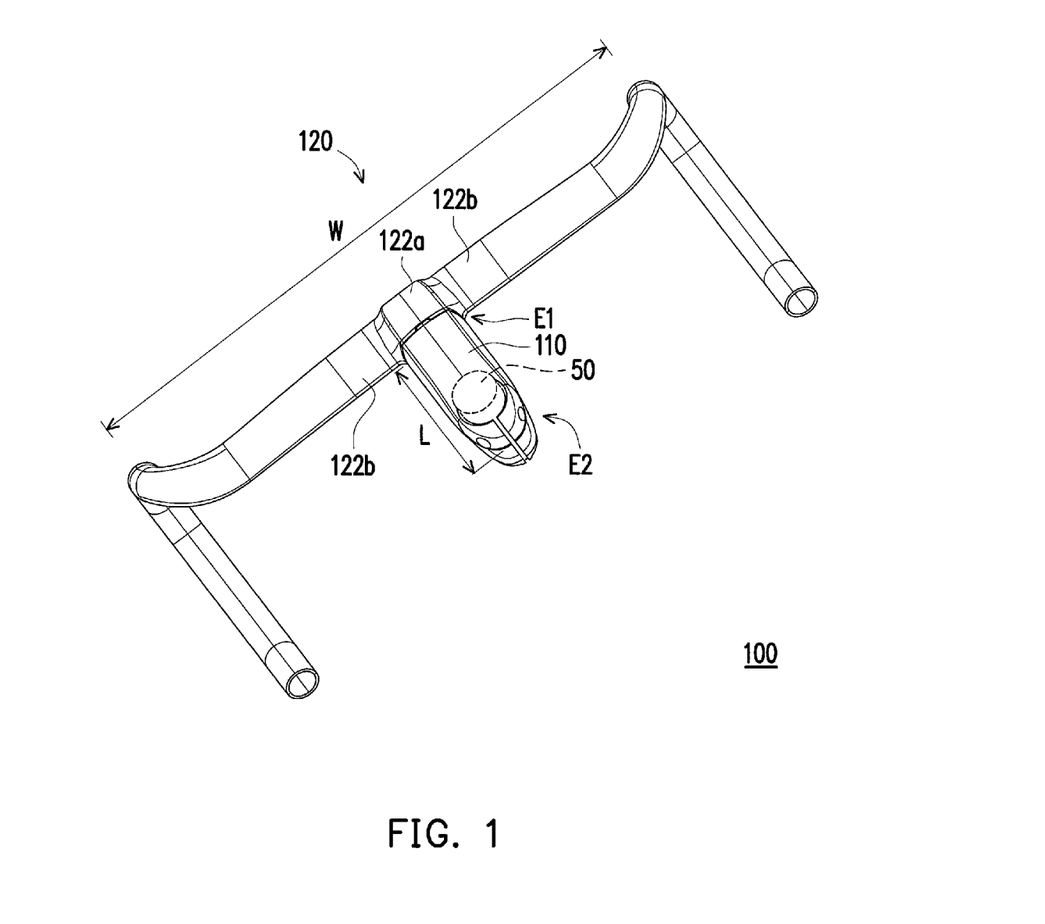
FIG. 1 is a three-dimensional view of a handlebar assembly according to an embodiment in the present invention.
Figure 2:
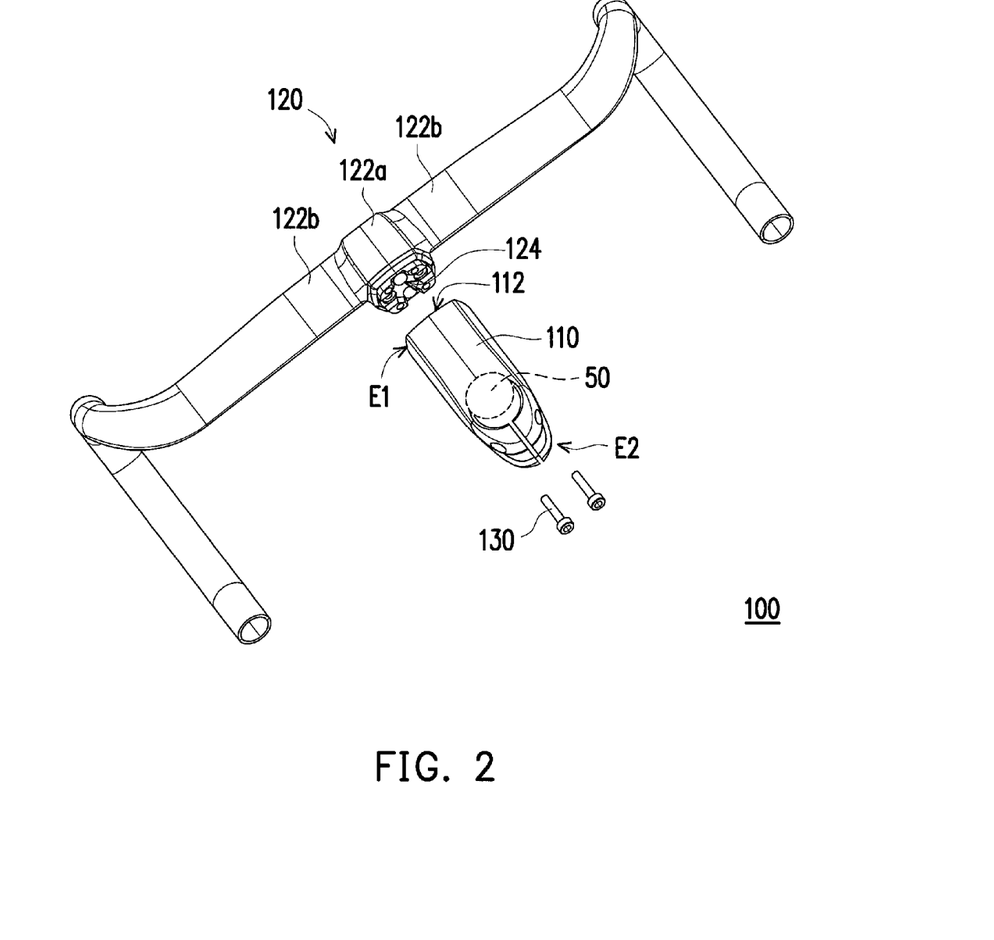
FIG. 2 is an exploded view of the handlebar assembly in FIG. 1.
Figure 3:
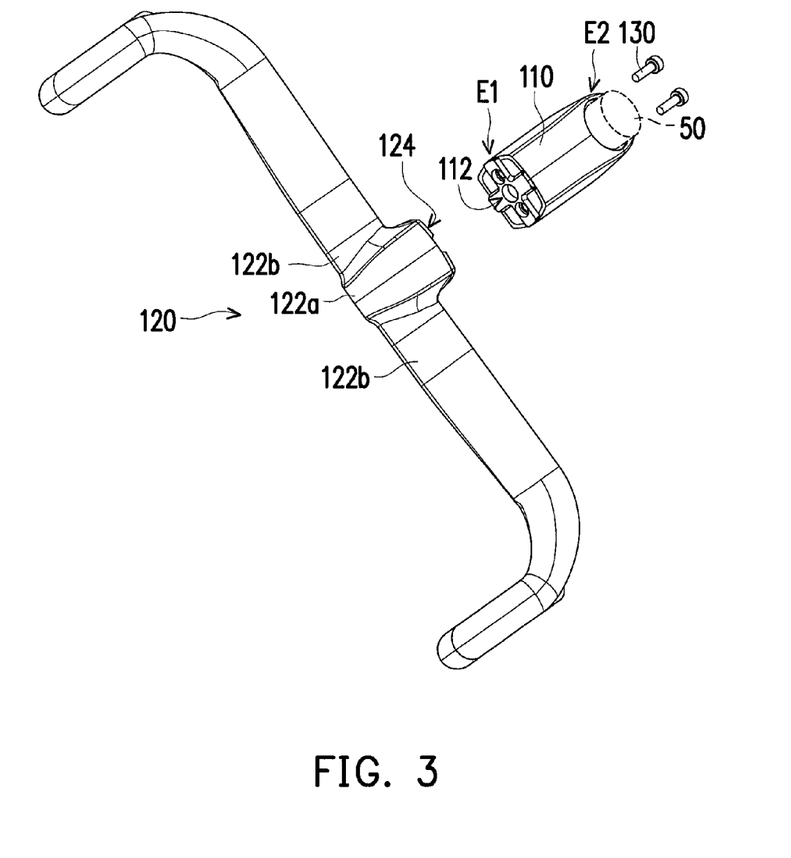
FIG. 3 is an exploded view of the handlebar assembly in FIG. 1 in another view angle.

FIG. 1 is a three-dimensional view of a handlebar assembly according to an embodiment in the present invention. FIG. 2 is an exploded view of the handlebar assembly in FIG. 1. FIG. 3 is an exploded view of the handlebar assembly in FIG. 1 in another view angle. Referring to FIG. 1 to FIG. 3, the handlebar assembly 100 includes a stem 110, a handlebar 120, and fasteners 130 in the present embodiment. The stem 110 includes a first end E1 and a second end E2 opposite to the first end E1. The handlebar assembly 100 is suitable to be assembled to a steerer tube 50 via the second end E2 of the stem 110 and installed on a bicycle (not shown).

On the other hand, in the present embodiment, the handlebar 120 includes a middle portion 122a and two handle portions 122b, wherein the handle portions 122b are positioned on two opposite sides of the middle portion 122a respectively. In other words, the two handle portions 122b are positioned symmetrically on a left and right sides of the middle portion 122a so that the user may control the direction of the handlebar 120 by holding the handle portions 122b. Moreover, in the present invention, the handle portions 122b of the handlebar 120 and the middle part 122a are manufactured in a single unitary piece, and the handlebar 120 is demountable to be assembled to the first end E1 of the stem 110.

Concretely speaking, referring to FIG. 2 and FIG. 3., the stem 110 includes a first fastening surface 112 positioned on the first end E1, and the middle portion 122a of the handlebar 120 includes a second fastening surface 124 in the present invention. When the handlebar 120 is assembled to the first end E1 of the stem 110, the first fastening surface 112 is infixed to the second fastening surface 124. Meanwhile, the fasteners 130 cross the first fastening surface 112 and the second fastening surface 124 infixed to each other so as to fasten the stem 110 and the handlebar 120, wherein the fasteners 130 are positioned within the stem 110 and the middle portion 122a of the handlebar 120.

To be more detailed, in the present invention, the stem 110 is a hollow rod-like body, and the first fastening surface 112 is manufactured in a single unitary piece on a surface of the first end E1 of the stem 110. Moreover, the first end E1 of the stem 110 may also enhance the fastening ability of the first fastening surface 112 manufactured in a single unitary piece on the stem 110 via embedding in an aluminium piece in the follow-up fastening process. However, in other embodiments, a lid may be additionally arranged at and fixedly connected to the first end of the stem so that the lid forms the first fastening surface, and yet the present invention is not limited thereto.

On the other hand, in the present invention, the middle portion 122a of the handlebar 120 is a hollow groove. Therefore, a lid (not shown) may be additionally arranged on the middle portion 122a and fixedly connected thereto. The lid is fixedly connected to the middle portion 122a so as to form the second fastening surface 124 by, for example, welding or gluing. However, in other embodiments, the middle portion 122a may not be a hollow groove or may not include a lid, and the second fastening surface may be directly formed on a surface of the middle portion of the handlebar, and yet the present invention is not limited thereto.

Moreover, since the stem 110 in the present invention is a hollow rod-like body, the fasteners 130 are able to cross into the inner portion of the stem 110 via the second end E2 of the stem 110, and fasten the stem 110 and the handlebar 120 by infixing the first fastening surface 112 to the second fastening surface 124. Meanwhile, one part of each of the fasteners 130 crosses into the middle portion 122a of the handlebar 120 while the other part of each of the fasteners 130 is positioned within the hollow rod-like body of the stem 110. Therefore, when the handlebar assembly 100 is installed on the steerer tube 50, the user is not able to see the fasteners 130 from the appearance of the bicycle, which keeps aesthetics of the bicycle, and the bicycle is able to move with lower wind resistance.

Figure 4A:
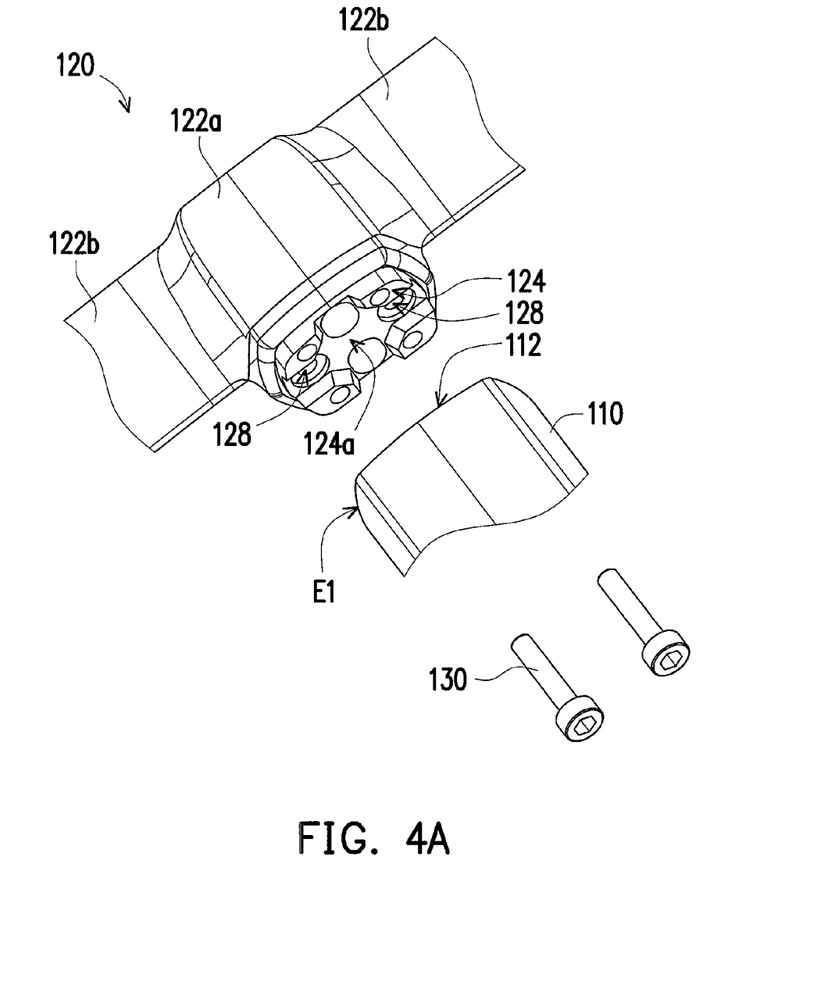
FIG. 4A is a partial enlarged view of the handlebar assembly in FIG. 2.
Figure 4B:
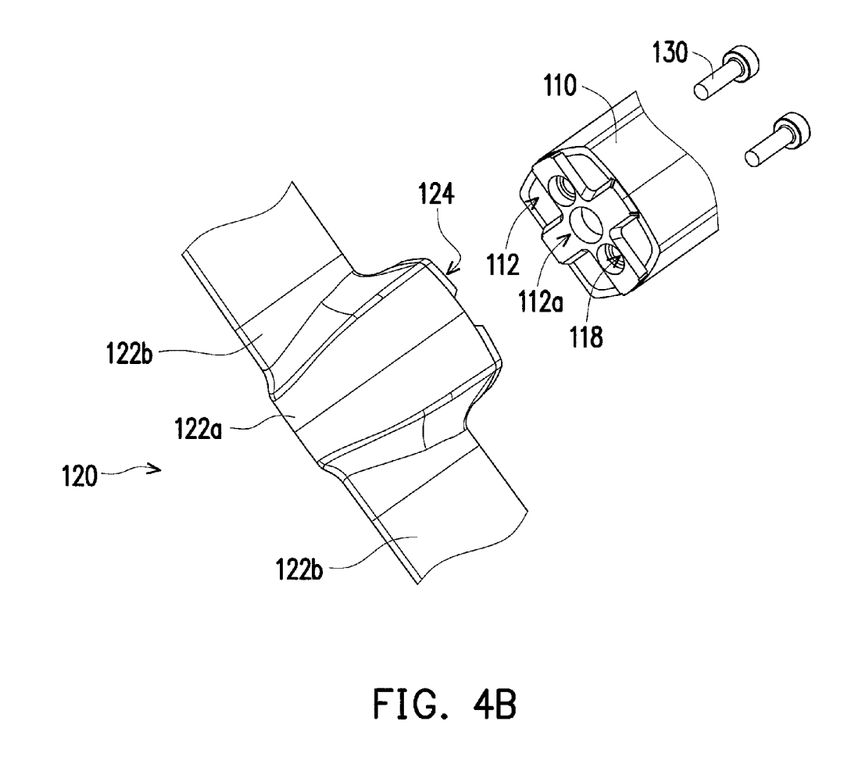
FIG. 4B is a partial enlarged view of the handlebar assembly in FIG. 3.

FIG. 4A is a partial enlarged view of the handlebar assembly in FIG. 2. FIG. 4B is a partial enlarged view of the handlebar assembly in FIG. 3. Referring to FIG. 4A and FIG. 4B, in the present embodiment, the stem 110 includes a convex fastening portion 112a positioned on the first fastening surface 112, and the middle portion 122a of the handlebar 120 includes a concave fastening portion 124a positioned on the second fastening surface 124. The shape of the convex fastening portion 112a coordinates with the shape of the concave fastening portion 124a so that the first fastening surface 122 is infixed to the second fastening surface 124.

Figure 5A:
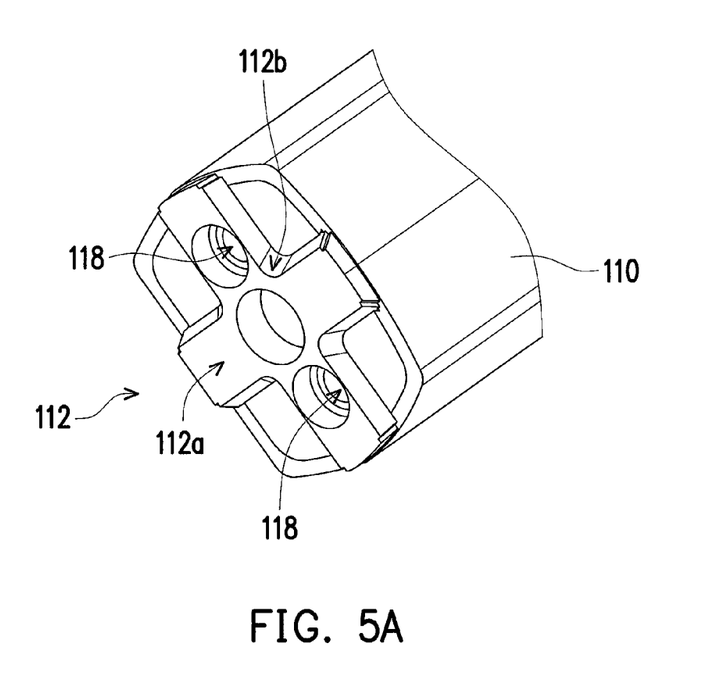
FIG. 5A is a partial enlarged view of the first fastening surface in FIG. 2.
Figure 5B:
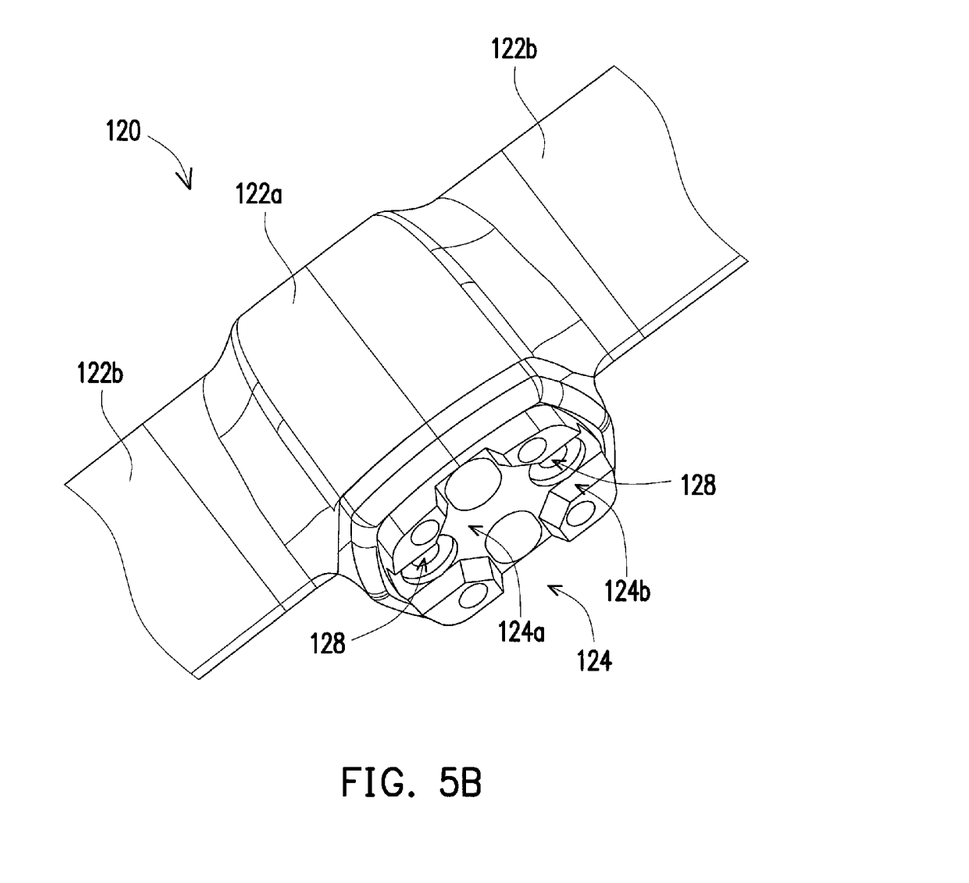
FIG. 5B is a partial enlarged view of the second fastening surface in FIG. 2.

FIG. 5A is a partial enlarged view of the first fastening surface in FIG. 2. FIG. 5B is a partial enlarged view of the second fastening surface in FIG. 2. Referring to FIG. 5A and FIG. 5B, in the present embodiment, the convex fastening portion 112a is in a crisscross shape. Since the concave fastening portion 124a coordinates with the convex fastening portion 112a, the concave fastening portion 124a is also in a crisscross shape. However, in other embodiments, the convex fastening portion 112a and the concave fastening portion 124a may be in, but not limited to, a ring shape, a double crisscross shape, an I shape, a cross shape, or other shapes in the present embodiments.

Hence, when the first fastening surface 112 is infixed to the second fastening surface 124, the crisscross-shaped convex fastening portion 112a is infixed to the crisscross-shaped concave fastening portion 124a so that the first fastening surface 112 and the second fastening surface 124 may not rotate relatively. Accordingly, after the fasteners 130 fasten the stem 110 and the handlebar 120, the stem 110 and the handlebar 120 may not be able to rotate relatively and may not further affect usage angles of the handlebar assembly 100.

Moreover, in the present embodiment, a periphery of the crisscross-shaped convex fastening portion 112a is a convex ramp surface 112b, and a periphery of the crisscross-shaped concave fastening portion 124a is a concave ramp surface 124b. The angle of inclination of the convex ramp surface 112b coordinates with that of the concave ramp surface 124b. When the convex fastening portion 112a is infixed to the concave fastening portion 124a, the convex ramp surface 112b leans against the concave ramp surface 124b. Therefore, the first fastening surface 112 and the second fastening surface 124 increase the contact area by the convex ramp surface 112b and the concave ramp surface 124b so as to ensure that the stem 110 and the handlebar 120 are properly infixed. The fastened stem 110 and the handlebar 120 are not able to rotate relatively, which leads to an enhancement of the strength of the handlebar assembly 100.

On the other hand, referring to FIG. 4A and FIG. 4B, in the present embodiment, the number of the fasteners is two, which are arranged symmetrically with respect to the center of the first fastening surface 112 and positioned on two opposite sides of the crisscross-shaped convex fastening portion 112a respectively. When the first fastening surface 112 is infixed to the second fastening surface 124, the convex fastening portion 112a is infixed to the concave fastening portion 124a so that the fasteners 130 fasten the stem 110 and the handlebar 120 through the two opposite sides of the convex fastening portion 112a and the concave fastening portion 124a and further provide an uniform fastening ability to the stem 110 and the handlebar 120.

Additionally, in other embodiments, the number of the fasteners 130 may be one, which is arranged symmetrically with respect to the center of the first fastening surface 112 and the second fastening surface 124, and positioned at the center between the convex fastening portion 112a and the concave fastening portion 124a. The crisscross-shaped convex fastening portion 112a and the concave fastening portion 124a are infixed to each other and not able to rotate relatively, and therefore the single fastener 130 is also able to fasten the stem 110 and the handlebar 120. However, when the stem 110 and the handlebar 120 are fastened by the single fastener 130, the fastener 130 with a high fastening ability may be required to ensure that the stem 110 and the handlebar 120 are able to be fastened tightly.

Moreover, in other embodiments, the number of the fasteners 130 may be at least three, which are arranged symmetrically with respect to the center of the first fastening surface 112 and the second fastening surface 124, such as to form a triangle. The more the number of the fasteners 130 is, the higher the fastening ability for the stem 110 and the handlebar 120 is provided, and yet more time needs to be spent on the fastening procedures throughout the assembly process. Therefore, the suitable number and positions of the fasteners 130 may be selected based on requirements, and the present invention is not limited thereto.

Referring to FIG. 5A, in the present invention, the stem 110 includes through holes 118 positioned on the first fastening surface 112 and penetrating the first fastening surface 112. Additionally, referring to FIG. 5B, the middle portion 122a of the handlebar 120 includes fastener holes 128 positioned on the second fastening surface 124. The numbers of the through holes 118 and the fastener holes 128 correspond to the number of the fasteners 130 respectively. In the present embodiment, the fasteners may be screws, and the fastener holes 128 may be screw thread through holes that run through the second fastening surface 124. However, in other embodiments, the fastener holes may be screw thread blind holes or screw holes on a bolt infixed to the second fastening surface, and yet the present invention is not limited thereto.

Figure 6:
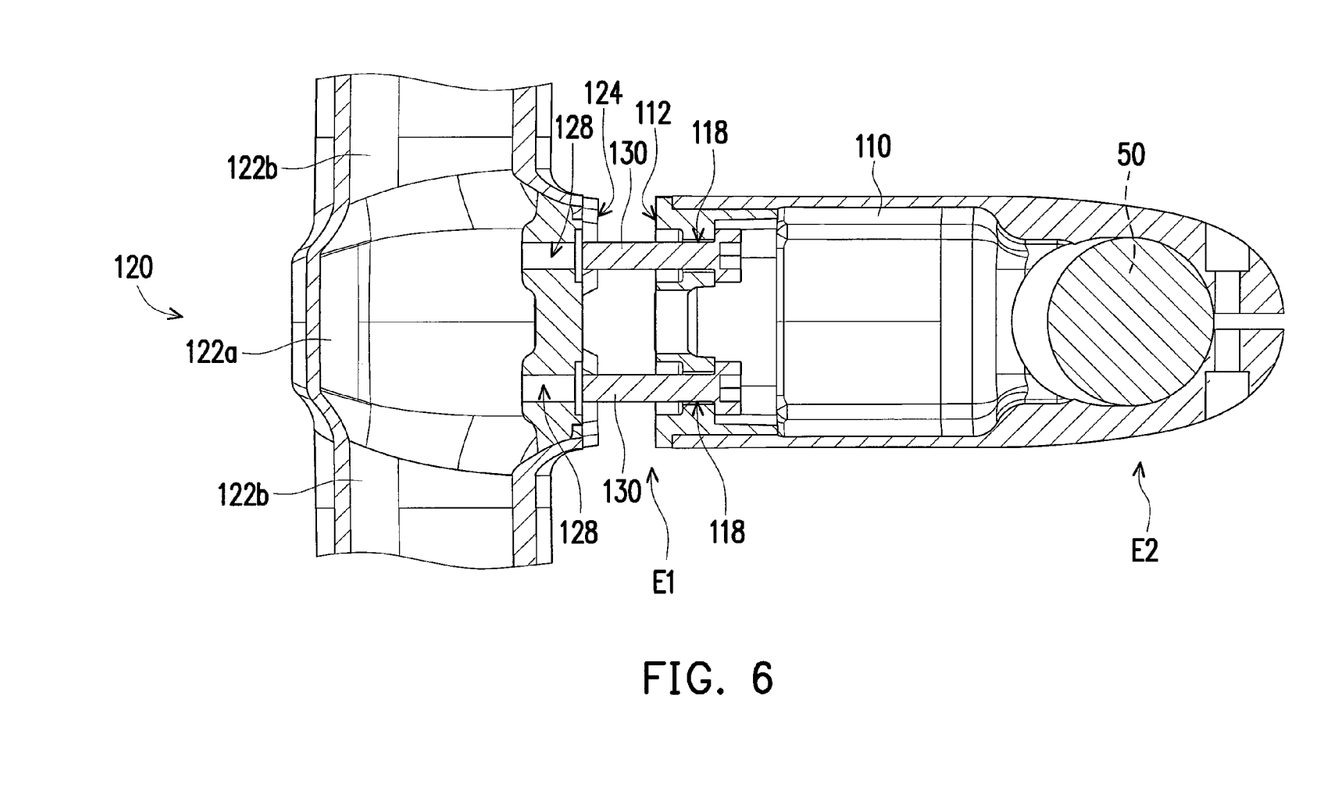
FIG. 6 is a top cross-sectional view of the handlebar assembly in FIG. 1.

FIG. 6 is a top cross-sectional view of the handlebar assembly in FIG. 1. Referring to FIG. 4A, FIG. 4B, and FIG. 6, in the present invention, the positions of the through holes 118 correspond to those of the fastener holes 128. Therefore, when the first fastening surface 112 are infixed to the second fastening surface 124, the fasteners 130 may cross into the inner portion of the stem 110 via the second end E2 of the stem 110 and cross out of the stem 110 via the through holes 118. After the fasteners 130 cross out of the stem 110 via the through holes 118, the fasteners 130 are able to be fastened to the fasten holes 128. Accordingly, the fasteners 130 fasten the stem 110 and the handlebar 120 through the through holes 118 and the fastener holes 128. Meanwhile, the fasteners 130 are positioned within the stem 110 and the middle portion 122a.

Figure 7A:
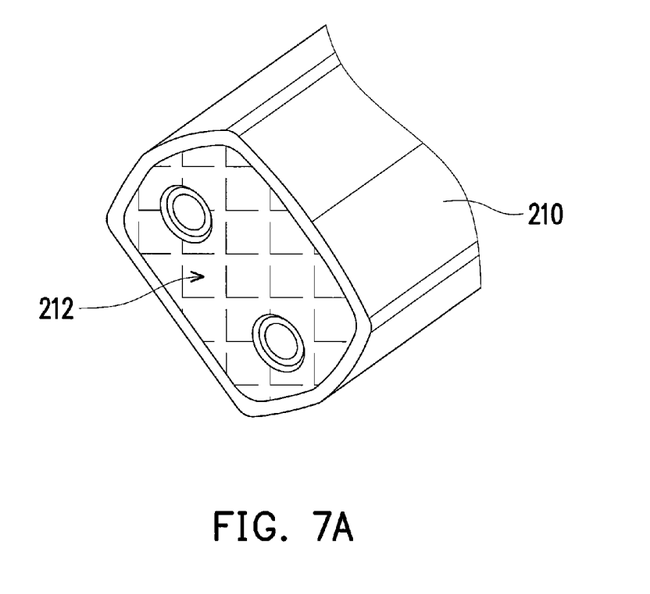
FIG. 7A is a partial enlarged view of a first fastening surface according to another embodiment in the present invention.
Figure 7B:
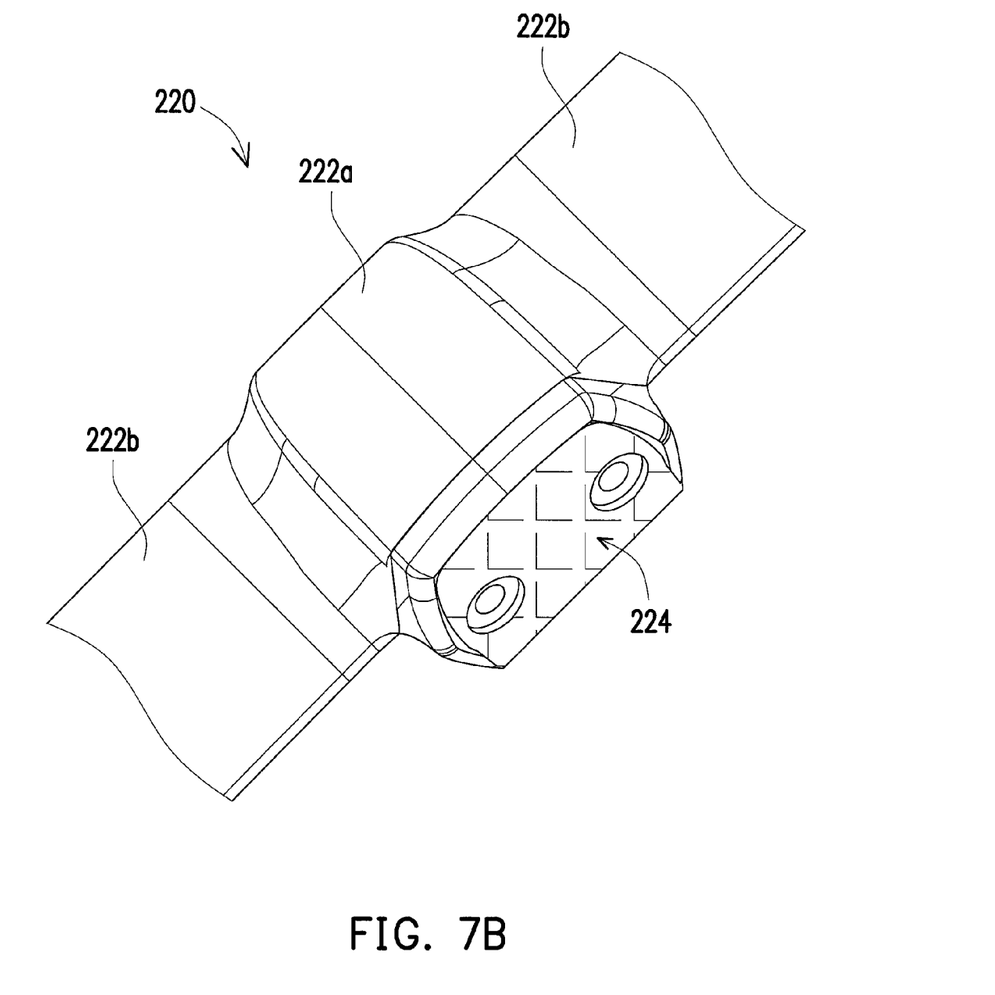
FIG. 7B is a partial enlarged view of a second fastening surface according to another embodiment in the present invention.

FIG. 7A is a partial enlarged view of a first fastening surface according to another embodiment in the present invention. FIG. 7B is a partial enlarged view of a second fastening surface according to another embodiment in the present invention. Referring to FIG. 7A and FIG. 7B, in the present invention, a stem 210 includes a first fastening surface 212. A handlebar 220 includes a middle portion 222a and two handle portions 222b positioned on two opposite sides of the middle portion 222a, wherein the middle portion 222a includes a second fastening surface 224.

In the present embodiment, the first fastening surface 212 is a first sand-blasting surface, and the second fastening surface 224 is a second sand-blasting surface, wherein the first sand-blasting surface is infixed to the second sand-blasting surface. The first sand-blasting surface and the second sand-blasting surface may be viewed as rough surfaces formed by the first fastening surface 212 and the second fastening surface 224 through a sand-blasting treatment. Therefore, when the first fastening surface 212 is infixed to the second fastening surface 224, the rough surfaces of the first sand-blasting surface and the second sand-blasting surface are infixed to each other, which increases the friction so as to prevent the first fastening surface 212 and the second fastening surface 224 from rotating relatively. However, in other embodiments, the first fastening surface and the second fastening surface may increase the fastening ability between themselves by other ways, and the present invention is not limited thereto.

Referring to FIG. 1, in the present embodiment, the handlebar 120 is demountable to be assembled to the stem 110 via the fasteners 130, and the stem 110 is installed on the bicycle by assembled to the steerer tube 50. Therefore, the user may select the stem 110 with a suitable length L, a suitable width W (measured from the left center to the right center of the stem), and the handlebar 120 with suitable shapes of the handlebar portion 122b and install them on the bicycle. Therefore, the handlebar assembly 100 are more convenient and practical.

To sum up the above, the present invention provides a handlebar assembly, wherein a stem of the handlebar assembly includes a first fastening surface, and wherein a middle portion includes a second fastening surface, and wherein the second fastening surface is infixed to the first fastening surface. A fastener crosses the first fastening surface and the second fastening surface infixed to each other to fasten the stem and the handlebar and is positioned within the stem and the middle portion. Therefore, the user may select the handlebar and the stem with suitable sizes, and the handlebar assembly includes fewer components and possesses a low wind resistance feature. Moreover, the stem includes a convex fastening portion positioned on the first fastening surface, wherein a periphery of the convex fastening portion is a convex ramp surface. The middle portion includes a concave fastening portion positioned on the second fastening surface, wherein a periphery of the concave fastening portion is a concave ramp surface. Therefore, when the first fastening surface is infixed to the second fastening surface, the convex fastening portion is infixed to the concave fastening portion and the convex ramp surface leans against the concave ramp surface. Therefore, the first fastening surface and the second fastening surface offer a better adaptability which prevents the stem and the handlebar from rotating relatively. Accordingly, the handlebar assembly possesses a high strength feature and the suitable sizes of the components of the handlebar assembly based on requirements may be selected to be assembled and installed on the bicycle and thus make the handlebar assembly be more convenient and practical.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handlebar assembly suitable to be installed on a steerer tube of a bicycle, the handlebar assembly comprises:
   a stem having a first end and a second end opposite to the first end, wherein the stem has a first fastening surface positioned at the first end, and the second end is suitable to be assembled to the steerer tube;
   a handlebar comprising a middle portion and two handle portions, wherein the handle portions are positioned on two opposite sides of the middle portion respectively, and the middle portion has a second fastening surface to be infixed to the first fastening surface; and
   a fastener crossing the first fastening surface and the second fastening surface infixed to each other to fasten the stem and the handlebar and positioned within the stem and the middle portion, wherein the stem has a convex fastening portion positioned on the first fastening surface, the middle portion has a concave fastening portion positioned on the second fastening surface, and the convex fastening portion is infixed to the concave fastening portion.

2. The handlebar assembly of claim 1, wherein the stein has a through hole positioned on the first fastening surface, the middle portion has a fastener hole positioned on the second fastening surface, and the fastener crosses into the stem via the second end of the stem and passes through the through hole to be fastened to the fastener hole.

3. The handlebar assembly of claim 1, wherein a periphery of the convex fastening portion is a convex ramp surface and a periphery of the concave fastening portion is a concave ramp surface, and the convex ramp surface leans against the concave ramp surface.

4. The handlebar assembly of claim 1, wherein the convex fastening portion and the concave fastening portion are in a crisscross shape.

5. The handlebar assembly of claim 1, wherein the number of the fastener is two, and the fasteners are fastened on two opposite sides of the convex fastening portion and the concave fastening portion.

6. The handlebar assembly of claim 1, wherein the fastener is arranged symmetrically with respect to the center of the first fastening surface.

7. A handlebar assembly suitable to be installed on a steerer tube of a bicycle, the handlebar assembly comprises:
   a stem having a first end and a second end opposite to the first end, wherein the stem has a first fastening surface positioned at the first end, and the second end is suitable to be assembled to the steerer tube;
   a handlebar comprising a middle portion and two handle portions, wherein the handle portions are positioned on two opposite sides of the middle portion respectively, and the middle portion has a second fastening surface to be infixed to the first fastening surface; and
   a fastener crossing the first fastening surface and the second fastening surface infixed to each other to fasten the stem and the handlebar and positioned within the stem and the middle portion, wherein the first fastening surface is a first sand-blasting surface and the second fastening surface is a second sand-blasting surface, and the first sand-blasting surface is infixed to the second sand-blasting surface.

* * * * *